Patented July 11, 1933

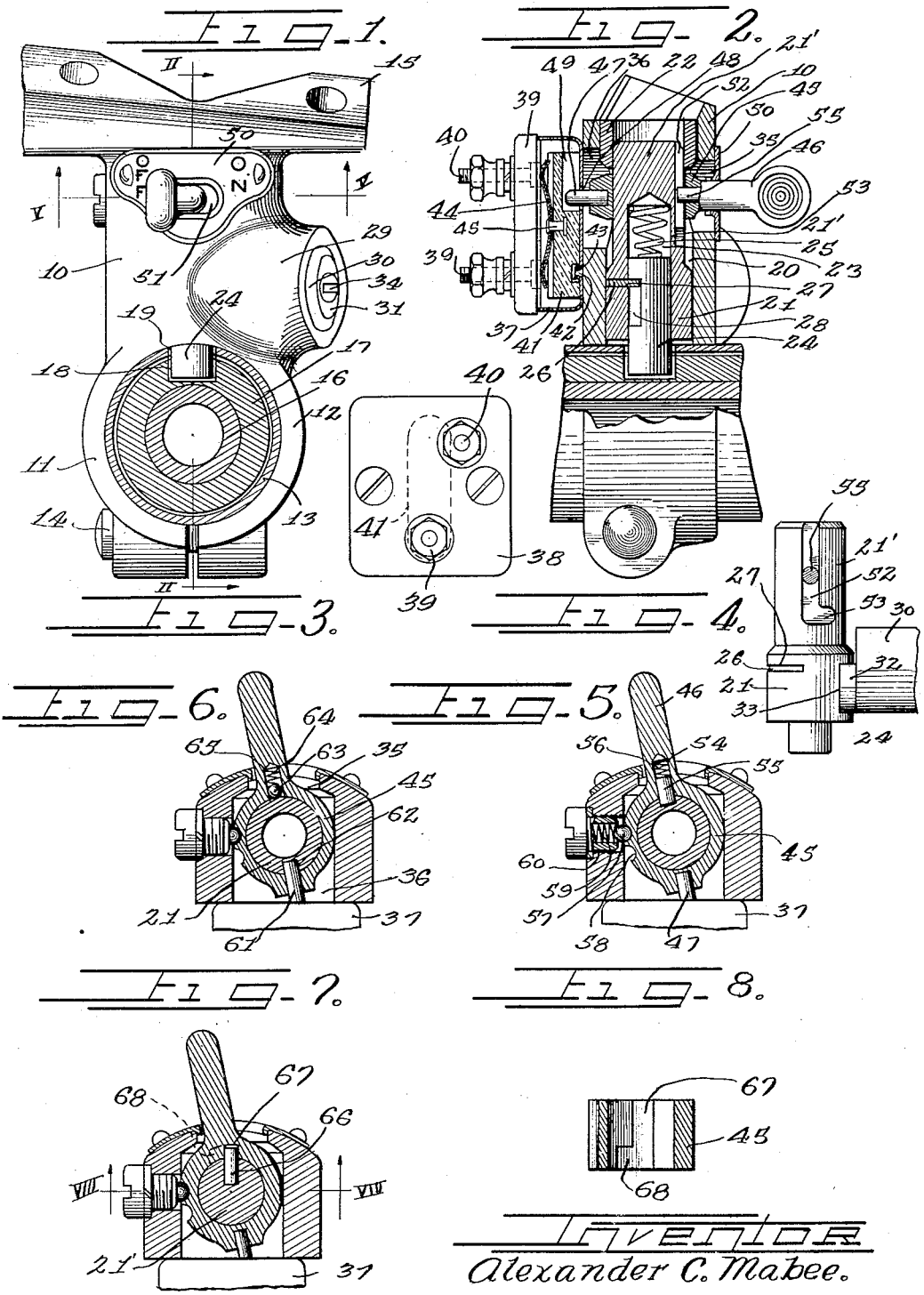

1,917,593

UNITED STATES PATENT OFFICE

ALEXANDER C. MABEE, OF VILLA PARK, ILLINOIS, ASSIGNOR TO OAKES PRODUCTS CORPORATION, OF NORTH CHICAGO, ILLINOIS, A CORPORATION OF MICHIGAN

LOCK STRUCTURE

Application filed March 11, 1932. Serial No. 598,202.

My invention relates to an improved lock structure which is of particular utility in automotive vehicles for locking control elements such as the steering and the ignition.

An important object of the invention is to provide structure and arrangement involving a locking bolt element adapted for only axial reciprocation, and a switch actuated element adapted only for rotary movement on an axis coincident with the axis of the locking bolt element, together with interlocking means for preventing one element from performing its function until the other element has been moved to a certain predetermined position.

A further object of the invention is to provide simple parts which can be economically manufactured and readily assembled to form a compact mechanism which is durable and efficient.

The various features in construction, arrangement and operation of my invention are shown incorporated in the structure disclosed on the drawing, in which drawing Figure 1 is a plan view of a lock structure applied to a steering column and shaft, with the column and shaft in section;

Figure 2 is a section on plane II—II of Figure 1;

Figure 3 is a plan view of the switch structure;

Figure 4 is a plan view of the lock bolt element and the key controlled lock cylinder for reciprocating the element;

Figure 5 is a section on plane V—V of Figure 1;

Figure 6 is a view similar to Figure 5 but showing a modified arrangement;

Figure 7 is a sectional view similar to Figure 5 showing another modified arrangement; and Figure 8 is a section through the switch operating lever structure on plane VIII—VIII of Figure 7.

The lock structure shown comprises a body or housing 10 having at its outer end the semi-annular extensions 11 and 12 for receiving the steering post 13 in an automobile, the sections being clamped around the post as by means of a bolt 14. At its inner end the body has the transversely extending flange 15 by means of which it may be secured to a suitable support as by example a dashboard of an automobile.

Extending through the steering post is the steering shaft 16 which at its upper end terminates in the steering wheel (not shown) and on this shaft is secured a collar 17 having a locking notch 18 in one side thereof which is adapted to register with the hole 19 through the steering post when the steering wheel comes to a certain position, usually in position for straight forward travel of the front wheels.

The body 10 has the longitudinal cylindrical bore 20 which is concentric with the hole 19 through the steering column. Within the bore 20 is the lock bolt structure comprising an outer part having the head 21 fitting in the bore and the reduced end 21' which at its rear end is guided by a bushing 22 secured in the end of the bore. Within the bolt structure body part is the axial pocket 23 for guiding the lock bolt or plunger 24, a spring 25 in the bottom of the pocket abutting the plunger and tending to shift it outwardly, the movement of the bolt being limited by the stop plate 26 extending through the transverse slot 27 and into the slot 28 cut in the bolt.

A lateral projection 29 on the body 10 provides a cylindrical pocket for a lock cylinder 30 through which extends a lock barrel 31 having at its inner end a cam disc 32 whose center is at one side of the axis of the barrel. This cam disc extends into a slot or channel 33 formed in the head 21 of the lock bolt element, the outer face of the cam disc engaging against the flat bottom or face of the channel 33 so that the lock bolt element will be held against rotational movement in the bore 20 but will be free to be reciprocated axially. Upon the insertion of a suitable key in the keyhole 34 of the lock barrel, the barrel may be turned to swing the cam disc 32 and to shift the lock bolt structure axially into locking or unlocking position, the movement of the cam disc being through 180° so that at the end of its movement the lock bolt element will be held in either its locking or unlocking position.

When the lock bolt element is shifted forwardly, the bolt 24 will enter the hole 19 in the steering column and if the notch 18 in the collar 17 on the steering shaft is in alignment with the hole 19 the bolt will enter the notch by force of the spring 25 and the steering shaft and column will be locked together so that the steering wheel cannot be turned.

At its opposite sides the housing 10 has the passageways 35 and 36 communicating with the bore 20. Secured to the housing 10 over the passageway 36 is the switch structure which comprises a sheet metal cup shaped housing 37 of rectangular shape for which is provided a cover 38 of insulating material supporting terminal posts 39 and 40 whose inner ends terminate in the case 37. Within the casing 37 is the oblong switch block 41 of insulating material having a pivot hole 42 in its face at one end for receiving a pivot projection 43 deflected from the bottom wall of the casing 37. On its outer side the switch block carries a switch blade 44 which is secured at its center to the block as by means of a rivet 45. One end of the switch blade is in alignment with the pivot projection 43 and is always in engagement with the terminal post 39, the other terminal post 40 being in position to be engaged by the other end of the switch blade when the switch block is swung.

The operation of the switch is controlled by a lever structure which comprises the annular hub 45 which receives the reduced end 21′ of the lock bolt structure head 21. Extending from the outer side of the hub is a lever arm 46 by means of which the hub may be readily rotated and extending from the opposite side of the hub is a pin 47 which extends through the clearance hole 48 in the bottom of the casing 37 and into the longitudinally extending slot 49 on the inner side of the switch block so that when the hub is rotated the switch block will be swung for either circuit closing or opening position. The passageway 35 is covered by an escutcheon plate 50 having the guide passageways 51 therethrough for the lever arm 46 and this passageway 51 and the clearance passageway 48 in the casing 37 will permit swing of the lever structure but will hold it against axial movement.

In the arrangement of Figures 1, 2, 4, and 5 the reduced end 21′ of the lock bolt structure has a slot 52 parallel with the bolt axis and extending forwardly from the rear end of the bolt structure and communicating at its front end with a transverse or circumferentially extending slot 53. Extending through the hub and partway into the lever 46 is a pocket 54 for a pin 55 which is urged outwardly by a spring 56, this pin cooperating with the slots 52 and 53 in the lock bolt structure. When the lock bolt structure is in its forward or locking position as shown in Figures 2, 4 and 5 the pin 55 will be within the longitudinal slot 52 and rotation of the lever structure and operation of the switch is at this time prevented. However, when the lock bolt structure is shifted rearwardly, its transverse slot 53 will be carried into registration with the pin 55 and then the lever structure may be swung in clockwise direction to swing the switch block to bring its switch blade into electrical engagement with the terminal post 40 and the circuit controlled by the switch will be closed. With the arrangement shown, the switch is open when the lock bolt structure is in locking position and the lever structure cannot be swung to close the switch until the lock bolt structure has been shifted to its unlocking position, and then the switch may be freely opened and closed. While the lever structure is in position to close the switch, the pin 55 will be in the transverse slot 53 and it will be impossible to shift the lock bolt structure back to locking position, but the switch lever must first be rotated to open the switch and bring the pin 55 back into alignment with the longitudinal slot 52. The lock bolt structure will then be free to be shifted forwardly to its locking position. The switch is controlled directly by operation of the lever structure independently of movement of the lock bolt structure when the lock bolt structure is in unlocking position but the interlocking engagement of the lever structure with the non-rotatable lock bolt structure when the lock bolt structure is in locking position holds the lever structure against operation at that time and with the switch closed. When the switch is thus held in closed position, the lock bolt structure may be freely reciprocated axially to locking or unlocking position, but only after it reaches the full unlocking position is the lever structure released therefrom so that it can be rotated to freely turn the switch on and off, but it must be rotated back to switch opening position before the lock bolt structure can be returned to locking position.

The spring 56 acting against the lever structure and the pin 55 will prevent rattling of the lever structure. The lever structure is yieldably held in its switch opening and closing positions by a ball 57 engaging in the stop notches 58 in the lever structure hub, the ball being pressed by a spring 59 retained with the plug 60 which is threaded into the wall of the housing 10.

In the arrangement shown in Figure 6, instead of using a separate interlocking pin, the pin 61 which extends from the lever structure to the switch may be extended radially inwardly to cooperate with the L-slot 62 provided in the end 21′ of the lock bolt structure, the operation being then the same as in the arrangement of Figures 1 to 5, the end of the pin being in the longitudinal slot section when the lock bolt structure is in locking position and being in register with the transverse slot section when the lock bolt structure is in unlocking position so that the switch controlling lever may then be swung for switch closing or opening. To prevent loose movement or rattling of the lever structure, a ball 63 may be pressed thereagainst by a spring 64 contained in the pocket 65 in the lever hub.

In the modified arrangement of Figures 7 and 8, the interlock pin 66 may be secured in the end of the lock bolt structure to cooperate with the axially extending slot section 67 and the circumferentially extending slot section 68 formed in the lever structure hub, the pin being in the axially extending section when the lock bolt structure is in locking position so that the lever structure cannot then be swung and being in alignment with the transverse section 68 when the lock bolt structure is shifted to unlocking position so that the lever structure may then be swung for manipulation of the switch.

The various parts for the lock structure may be very readily assembled. The lock bolt structure is first inserted into the bore 20 from the rear end thereof and then shifted forwardly far enough to permit insertion of the lever structure through the opening 36. The lock bolt structure is then shifted back through the hub of the lever structure and the bushing 22 is secured in the end of the bore 20. The lock cylinder is then applied with its cam disc 32 engaging in the slot 33 of the lock bolt structure and the cylinder is secured in place. The switch structure is then secured to the housing and the lock structure is ready for operation.

On the escutcheon plate 50 the indication "Off" and "On" may be printed with which the arm 46 of the switch controlling lever cooperates to indicate the condition of the switch. The lock cylinder used may be of the type which will prevent withdrawal of the key except when the lock bolt structure is in locking position.

I have shown practical and efficient embodiments of the various features of my invention, but I do not desire to be limited to the exact construction, arrangement and operation shown and described as changes and modifications may be made without departing from the scope of the invention as defined by the appended claims.

I claim as follows:

1. Lock structure comprising in combination, a housing having a bore therethrough, a lock bolt element shiftable axially in said bore but restrained against rotational movement, an actuating element comprising a hub entirely within said housing concentric with said bolt element, means accessible from the exterior of said housing for rotating said hub, a switch mounted on said housing and an operating extension extending thereto from said hub whereby said switch will be operated when said hub is rotated, means controlled by said bolt element when in locking position to prevent rotation of said hub, and when in unlocking position to permit rotation of said hub, and means controlled by the rotation of said hub to lock said bolt element against return to locking position.

2. In combination in a lock structure, a housing having a bore, a lock bolt element reciprocable axially in said bore but restrained against rotational movement, an actuating element within said bore between the ends thereof and fulcrumed on said bolt element for rotational movement, means restraining said actuating element against axial movement, a switch structure mounted on said housing, means operatively connecting said actuating element with said switch structure, and interlocking means effective to release said actuating element for switch operation only when said bolt element is in unlocking position and to prevent return movement of said bolt element to locking position when said actuating element has been operated after release thereof, said interlocking means comprising a slot in one of said elements and a pin on the other element engaging in said slot.

3. In combination in lock structure, a housing having a bore therethrough, a lock bolt element in said bore shiftable axially to locking or unlocking position, a guide head for the outer end of said lock bolt element fitting said bore, a bushing in the rear end of said bore receiving and guiding the rear end of said bolt element, a switch mounted on said housing, an actuating element for said switch having operative connection therewith and journalled on said bolt element between said guide head and bushing, means restraining said bolt element from rotational movement, means restraining said actuating element against axial movement, and an interlocking connection between said elements operative to release said actuating element only when said bolt element is in unlocking position and to prevent return of said bolt element to locking position when the released actuating element has been moved to switch operating position.

4. In lock structure, the combination of a housing having intersecting longitudinal and transverse bores, a lock bolt element shiftable axially in said longitudinal bore, means restraining said bolt element against rotational movement, a switch structure mounted on said housing, an actuating element for said switch structure located in said transverse bore and surrounding said bolt element and being adapted for rotational movement, means restraining said actuating element against axial movement, and interlocking means between said elements operative to release said actuating element for switch operation thereby only when said bolt element is in unlocking position and to hold said bolt element against return to locking position when said switch structure is operated by said actuating element after release thereof.

5. In lock structure for the steering and ignition of an automobile vehicle, the combination of a housing having intersecting longitudinal and transverse bores, a lock bolt element shiftable in said longitudinal bore to locking and unlocking position, means holding said bolt element against rotational movement, an ignition controlling switch on said housing, an actuating element for said switch in said transverse bore journaled on said bolt element for rotational movement to operate said switch, means holding said actuating element against axial movement, and an interlocking connection between said elements operable to release said actuating element for switch operation only when said bolt element is in unlocking position and to prevent return of said bolt element to locking position when said actuating element is in position to open said switch.

6. In combination in a lock structure, a housing, a lock bolt member shiftable axially in said housing to locking or unlocking position, a switch, an actuating member for directly actuating said switch and extending transversely through said housing and being concentric with and entirely supported by said bolt member, and means for locking said actuating member against switch operation thereby except when said bolt member is in unlocking position.

7. In combination in a lock structure, a housing, a lock bolt member shiftable axially in said housing to locking or unlocking position, a switch, a rotatable actuating member journaled on and entirely supported by said bolt member and having operative connection with said switch independently of said bolt member, and means for locking said actuating member against switch operation except when said bolt member is in unlocking position.

8. In combination in a lock structure, a housing having a bore therethrough, a lock bolt element shiftable axially in said housing but restrained from rotational movement, a rotatable actuating element extending into said housing and supported entirely by said bolt, a switch on said housing connected with said actuating element, and means for interlocking said element whereby to prevent operation of said actuating element except when said lock bolt element is in unlocking position.

9. In combination in a lock structure, a housing, a non-rotatable lock bolt element shiftable axially in said housing to locking or unlocking position, an actuating element supported entirely on said bolt element and movable thereon, and a switch controlled by the movement of said actuating element.

10. In combination in a lock structure, a housing, a non-rotatable lock bolt element shiftable axially in said housing to locking or unlocking position, an actuating element supported entirely on said bolt element and movable thereon, a switch controlled by the movement of said actuating element, and means whereby to prevent movement of said actuating element when said lock bolt element is in locking position.

11. A lock structure comprising a housing having a longitudinal passageway therethrough, a non-rotatable lock bolt element movable in axial direction in said passageway, a bushing in the inner end of said passageway for guiding the inner end of said lock bolt element, a switch, an actuating element in said housing adapted when rotated to operate said switch, and locking means for locking said actuating element to prevent rotational movement thereof when said lock bolt element is in locking position and to release said actuating element for rotation when said lock bolt element is in unlocking position and to prevent return movement of said lock bolt element to locking position while said actuating element is being rotated to operate said switch.

In testimony whereof I have hereunto subscribed my name at Chicago, Cook County, Illinois.

ALEXANDER C. MABEE.